Dec. 14, 1948. S. MOLCHAN Re. 23,061

CURLING ROD

Original Filed Aug. 25, 1944

Stephen Molchan Inventor

By R. J. Jurick Attorney

Reissued Dec. 14, 1948

Re. 23,061

UNITED STATES PATENT OFFICE 23,061

CURLING ROD

Stephan Molchan, El Monte, Calif., assignor of one-half to Hy Schwartz, Los Angeles, Calif.

Original No. 2,404,517, dated July 23, 1946, Serial No. 551,138, August 25, 1944. Application for reissue July 23, 1947, Serial No. 762,865

3 Claims. (Cl. 132—34)

This invention pertains to a device employed in the art of hair waving and more particularly to the novel construction of a rod upon which the hair is wound or wrapped to impart permanent curls thereto.

Various processes for imparting a permanent wave to the hair have been practiced for many years, but these processes have depended primarily upon the application of electrically developed heat and required a time cycle measured in hours. The newer hair waving methods have been developed to eliminate the necessity of the customer spending uncomfortable hours under the electric heater.

One of the more promising of the newer processes is known as the cold wave process. In this process the head of hair is sectioned off and each section is wound or wrapped around a small diameter rod to form curls. The number of rods required depends upon the ease or difficulty with which the particular hair curls are formed, but in general approximately thirty rods are required to wave the average head. The curling rods are provided with a metal spring, or elastic band which can be snapped over the curled hair to maintain the hair in the curled state and to retain the rods in suspended position about the scalp. After all the hair is curled around the rods, the operator applies a preferred chemical solution to all the individual curls either directly from a bottle, from a bulb syringe-like injector, or by means of a small brush, cotton dab, etc. The entire head is then enclosed within a suitable cap for approximately thirty minutes during which time the chemical solution reacts with the hair to impart a permanent wave thereto.

The cold wave process has not met with universal acceptance and I have found that the main reason for a large percentage of failures is the inability of an average operator to properly wet the individual hair strands with the chemical solution. I have found that to produce acceptable results all hair strands must be completely and uniformly moistened by the solution, but there exists at present no certain way of accomplishing this. Inasmuch as each curling rod contains a bundle of hair curled into a mass several inches long and approximately an inch in diameter, it is apparent that the normal methods of moistening the mass externally do not permit penetration of the solution to the inner layer of hair strands. Consequently, the inner hair curls do not receive a permanent set and as these inner curls are the extremities of the hair the completed job is not at all pleasing to the customer. Experienced operators have developed personal knacks which make it possible to produce a practical percentage of acceptable waves, but the average operator soon becomes discouraged and reverts to the old heat process.

A curling rod made in accordance with my invention makes it possible for inexperienced operators to completely and properly moisten all the hair of the curl and thus assure good results.

An object of this invention is the provision of a hair curling rod which is adapted for use with a small hand syringe whereby the hair waving solution is applied to the hair under pressure thereby assuring even distribution of the solution.

Another object of this invention is the provision of a hair curling rod having an axial bore in one end thereof and connecting with longitudinal slits in the body of the rod whereby liquid forced into the bore will seep out through the slits substantially along the entire length of the rod.

Still another object of this invention is the provision of a hair curling rod provided with a relatively heavy washer rotatably secured near one end thereof and a flexible rubber strap looped through the rubber washer in such manner that the strap may be stretched across a band of hair curled round said rod to retain the hair and rod in fixed position on the head.

These and other objects and advantages will be apparent from the following description when taken with the accompanying drawing which illustrates one embodiment of the invention. The drawing is for purposes of illustration and is not to be construed as defining the scopes or limits of the invention; reference being had for this purpose to the appended claims.

In the drawings that follow, like characters identify like parts in the various views.

Figure 1:
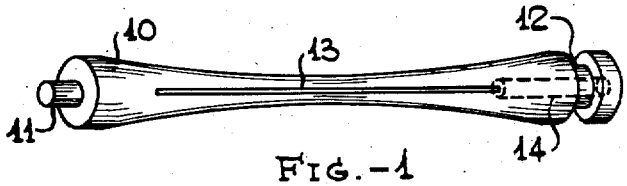
Fig. 1 is an isometric view of a rod made in accordance with my invention.
Figure 2:
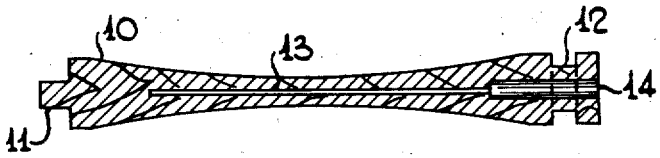
Fig. 2 is a central longitudinal sectional view of the rod shown in Fig. 1.

Referring now to Fig. 1 and Fig. 2, the numeral 10 identifies a rod of generally concave form, that is, having a progressively increasing, circular cross-section from the center toward each end. This rod may be made of plastic, metal or wood and includes an integral extension 11 of reduced diameter at one end and a circumferential groove 12 at the other end. A thin longitudinal slit 13 extends completely through the rod, said slit being in direct communication with a central bore 14. It is apparent that liquid or any fluid forced into the bore 14 will flow out of the slit readily when under pressure. I have found that a single slit as described is sufficient for practical purposes but it is obvious that a plurality of slits may be employed.

Figure 3:
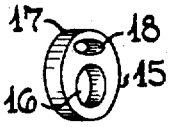
Fig. 3 is an isometric view of the rubber washer.
Figure 5:
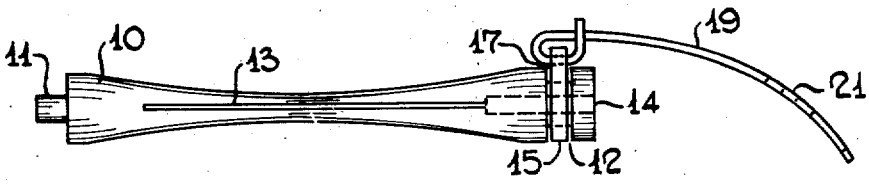
Fig. 5 is a front view of the rod showing the rubber washer and strap assembled thereon.

Fig. 3 illustrates a relatively thick rubber washer 15 having a hole 16 that is of a diameter somewhat larger than the diameter of the rod 10 at the bottom of the circumferential groove 12. Thus, the washer 15 may be forced over the rod to loosely occupy the groove 12 as shown in Fig. 5; the rod and washer being readily rotatable one relative to the other. The washer 15 also includes an integral extension 17 having an opening 18 cut or punched therein for purposes described below.

Figure 4:
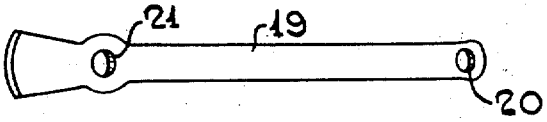
Fig. 4 is an isometric view of the rubber strap.
Figure 6:
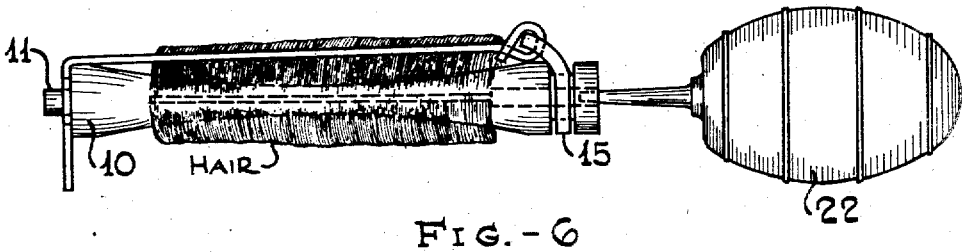
Fig. 6 is a view of the complete rod showing the hair curled thereon, the strap in its hair retaining position and the manner of injecting liquid into the rod by means of a hand syringe.

A pliable rubber strap 19 of the general form shown in Fig. 4 includes a hole 20 at one end and a hole 21 at the other end. In assembling my complete hair curling rod, the end of strap 19 is forced through the hole 18 in rubber washer 15 and looped through the hole 20 to form a slip knot as illustrated in Fig. 5. By assembling the strap and washer in this manner, the strap has a normal tendency to extend to the right as shown and may, therefore, be conveniently held by the operator in the palm of the right hand. Thus held, the rod 10 may readily be rotated by the fingers of the left hand during the act of wrapping hair around the rod. When the hair is wrapped or curled around the rod to the desired extent, the strap 19 is stretched across the rod and the hole 21 looped over the extension 11 as shown in Fig. 6. The overall length of the strap 19 is predetermined so that with the strap in hair-clamping position it will be under some tension thus providing a clamping action to retain the hair in the wound or curled state and to retain the rod in the desired position during other phases of the hair waving process. With the hair retained in curls around the rod the operator inserts the nozzle of the small hand syringe 22 into the bore 14 and forces a chemical hair waving solution into the rod. The solution rapidly emerges from the slit 13 and being subjected to material pressure, the liquid oozes throughout the entire mass of hair, thus completely moistening all individual hairs evenly and thoroughly.

Having now described my invention various changes may be made in the construction of the parts without departing from the scope and spirit of the invention as set forth in the claims.

I claim:

1. A hair curling device comprising a rod having an integral extension of reduced diameter at one end and provided with a circumferential groove at the other end; a relatively rigid washer rotatably disposed within said groove; and a flexible strap having a hole near each end thereof, said strap detachably secured to the said washer and adapted to be stretched across the rod and looped over the integral extension of the rod on the opposite end thereof.

2. The invention as recited in claim 1 wherein the rod is of concave form having a progressively increasing diameter from the center toward the ends.

3. In a hair curling device comprising a rod having an integral extension of reduced diameter at one end and a holding means in the groove adapted to rotate therein, provided with a circumferential groove at the other end; and a strap means having a hole near each end thereof, said strap being detachably secured to said groove by coupling it to a portion of the holding means, said strap being adapted to be stretched across the rod and its free end looped over the integral extension of the rod on the opposite end thereof.

STEPHAN MOLCHAN.

REFERENCES CITED

The following references are of record in the file of this patent:

UNITED STATES PATENTS

| Number | Name | Date |
|---|---|---|
| 1,989,991 | Klein | Feb. 5, 1935 |
| 2,112,074 | Cunnyngham | Mar. 22, 1938 |
| 2,266,111 | Willat | Dec. 16, 1941 |
| 2,331,065 | Willat | Oct. 5, 1943 |